June 3, 1969 L. D. GREEN ET AL 3,448,207

METHOD AND APPARATUS FOR ACCOMPLISHING LINE SKIPPING IN A FACSIMILE SYSTEM

Filed July 14, 1965 Sheet 1 of 6

BY Anthony D. Cennamo

BY Anthony D. Cennamo

BY
Anthony D. Cennamo

BY Anthony D. Cennamo

BY Anthony D. Cennamo

BY

Anthony D. Cennamo

United States Patent Office 3,448,207

Patented June 3, 1969

3,448,207

METHOD AND APPARATUS FOR ACCOMPLISHING LINE SKIPPING IN A FACSIMILE SYSTEM

Leland D. Green, Pasadena, Robert W. Reynolds, Los Angeles, Waldemar Saeger, La Canada, and Armand R. Tanguay, Pasadena, Calif., assignors to Xerox Corporation, Rochester, N.Y., a corporation of New York Filed July 14, 1965, Ser. No. 471,874
Int. Cl. H04n 7/00
U.S. Cl. 178—6 8 Claims

ABSTRACT OF THE DISCLOSURE

A facsimile transmission system in which a plurality of distinct adjacent areas of a document to be transmitted are simultaneously scanned to detect the presence of blank lines forward of the normal scan detector in the direction of normal scan. In response to the detection of a blank line forward of the normal scan head, logic circuitry is actuated to control the rapid incremental advancement of the scan head at the transmitter and the print or write head at the receiver to the next appropriate non-blank line.

This invention relates to a graphic communication system and more particularly to methods and apparatus for accomplishing line skipping in a facsimile system.

Facsimile and television are each concerned with the transmission of images by converting an original multidimensional subject to time-varying signals corresponding to the density variations along some predetermined scanning raster. Means are provided at the receiving location to reconvert the signals into corresponding density variations along a corresponding scanning raster. It has long been acknowledged that facsimile and television are high inefficient methods of transmitting information, and particularly printed matter and the like, because the information content of the original document is typically far less than the information handling capacity of the transmission link which must be provided. A facsimile or television transmitting link is capable of transmitting a certain predetermined number of density variations in each second, but a typical original subject or document will contain exetensive black and white areas with the black are corresponding to the information to be transmitted and the white areas corresponding to unmarked or informationless areas. In a typical system no signal is generated for such informationless areas thus resulting in the transmission link being idle for a period of time during which it would otherwise be capable of transmitting a large amount of information. Many coding schemes and the like have been proposed to permit the use of transmission links having reduced capacity or to permit the use of existing links while reducing the length of time required to transmit a given image. Such methods have generally been quite complex and thus poorly suited for use with compact and inexpensive facsimile equipment or comparable television equipment.

A principal application of facsimile equipment and slow scan television equipment is in the transmission of printed or type written documents and letters. It is a distinguishing characteristic of these original documents that the printing or typing is arranged in substantially horizontal lines. Examination of a typical letter, for example, will show that the lines of typing actually occupy considerably less than half the vertical dimension of the letter, the rest of this dimension being blank and corresponding to spacing between lines as well as blank spaces at the top and bottom of the letter. In a conventional facsimile system all parts of such a letter are scanned at the same uniform speed. Assuming transmission over an ordinary telephone line, it may take in the order of six to fifteen minutes to transmit an ordinary letter with reasonable resolution. Considering the cost of telephone service, such a long transmission time becomes a serious limitation on the economic usefulness of facsimile equipment.

One prior art method of which applicants are aware for reducing the transmission time involves the manual advancing of the scanning head at the transmitter over the blank spaces on the document to be transmitted by an operator. This method has the inherent disadvantage of requiring monitoring by the operator. Further, the amount of obtainable compression would be a function of the operator's skill and would be feasible only for large blank spaces on the document to be transmitted. Another method involves an operator actuated switch for causing the head or scanner mechanism at the transmitter to move at a high velocity over the blank areas of the document while the switch is depressed. This method also suffers from the inherent disadvantages of requiring monitoring by an operator and additionally may result in the inadvertent skipping of a portion of the document. The major disadvantage of these methods is that the reproduced copy is not a facsimile of the original document.

It is therefore an object of this invention to automatically and reliably reduce the amount of time required to transmit a document having blank or unused portions thereon through a facsimile system.

It is another object of the present invention to provide a simple, compact and inexpensive facsimile system which is capable of transmitting documents in a reduced length of time.

It is another object of the present invention to provide a facsimile equipment in which blank lines are automatically skipped at both the transmitter and receiver.

It is a further object of the present invention to provide improved methods for automatically detecting and logically controlling line skipping of blank lines at the transmitter and receiver in a facsimile system.

In accomplishing the above objects and other desirable aspects, applicants have invented improved methods and novel apparatus for simulatneously scanning a plurality of distinct adjacent areas of a document to be transmitted via a facsimile system to detect the presence of blank lines forward of the normal scan detector in the direction of normal scan. In response to the detection of a blank line forward of the normal scan head, logical circuitry is actuated to control the rapid incremental advancement of the scan head at the transmitter and the print or write head at the receiver to the next appropriate non-blank line.

For a more complete understanding of the invention and the various embodiments thereof reference may be had to the following detailed description in conjunction with the drawings in which.

Figure 1:
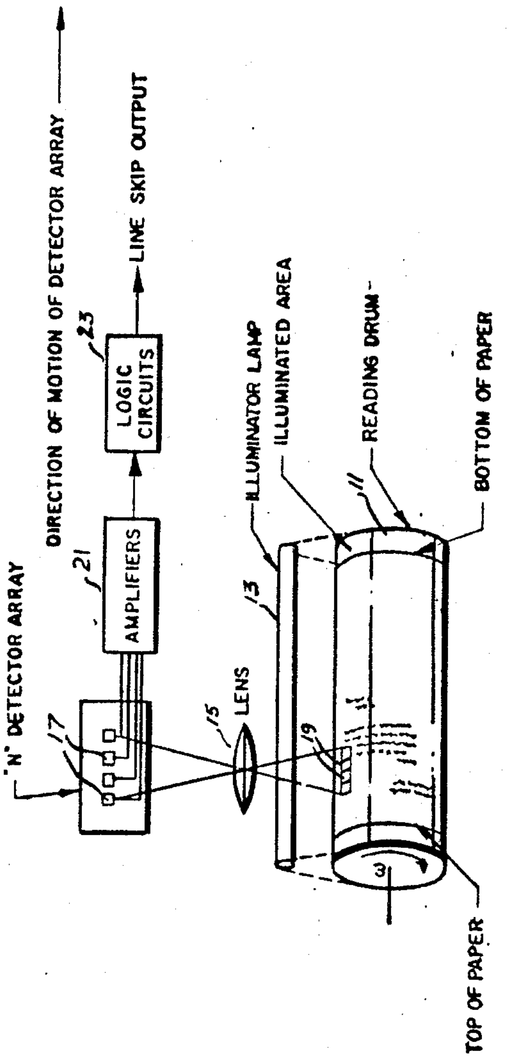
FIG. 1 is a block diagram of a linear pre-scan detector array in accordance with the present invention.

Referring now to FIG. 1 there is shown a first embodiment of the pre-scan detector array for accomplishing line skip operation in a facsimile system in accordance with the present invention. The document to be scanned and sent via a facsimile system is positioned on a rotatably supported reading drum 11 by any means, not shown. The rotation of the drum brings successive areas of a document line under illuminator lamp 13 and the varying intensity reflected light signals corresponding to the scanned information is focused by lens 15 on plurality of spaced-apart light responsive detectors 17. The array may include the normal video detector and a plurality of pre-scan detectors. The light responsive detectors may be of any type known in the art, for example, photoelectric cells. The scanned area 19 would include a predetermined number of lines in advance of the normal scan detector. The spacing of the scanned areas would depend on the resolution of the facsimile system and may, for example, comprise a hundred lines per inch.

The output of the pre-scan detectors is fed to amplifier 21 which in turn controls a logic circuit 23. Logic circuit 23 controls in a manner hereinafter to be more fully explained, the incremental advance of the reading drum at the transmitter and the recording drum at the receiver in the direction of scan. The orientation of the prescanning detectors in such as to scan *n* lines ahead of the normal reading head in one drum revolution. Assuming a margin width for synchronizing and line skipping equal to 10% of the drum circumference, then in response to the detection of one or more blank areas, logic circuit 23 will command a number of line advances equal to the number of detected blank areas during the next or several successive revolutions by actuating appropriate motion drive means, for example, a stepping motor not shown. Thereafter, the system will return to its normal scan speed and the pre-scan selectors will again scan the area forward of the normal scan head for blank areas which if detected will again actuate the logic circuit.

Figure 2:
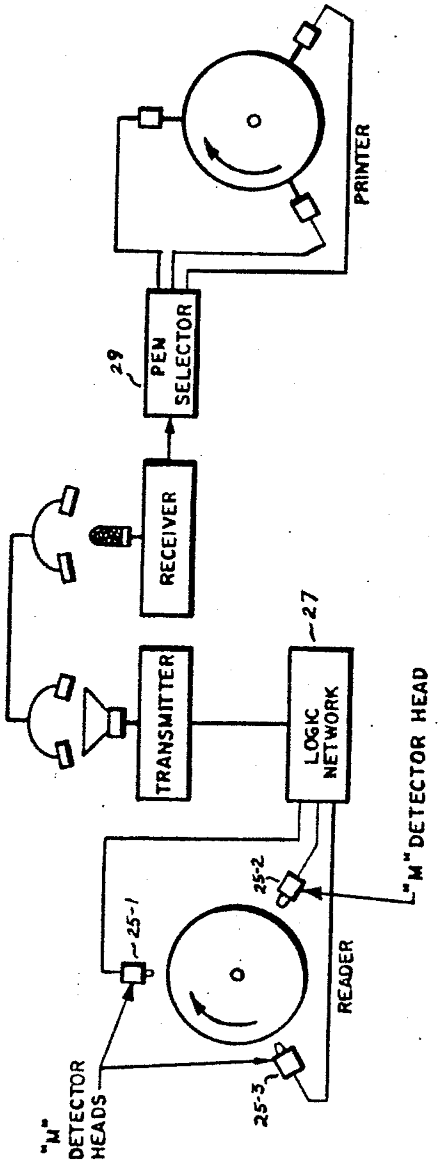
FIG. 2 is a block diagram of a facsimile system having a spaced apart multiple predetector array in accordance with another embodiment of the invention incorporated in the transmitter.

Referring now to FIG. 2 there is shown a facsimile system in which a multiple head pre-scan detector is embodied in the transmitter. As shown, three detector heads 25–1, 25–2 and 25–3 are equally spaced apart about the periphery of the reader drum. This particular pre-scan system known as N-line M-scan system is particularly adaptable for systems in which lined forms or the like are transmitted over a facsimile network. With the spacing of the detector heads as shown, after the reader drum has rotated one-third of a revolution, reader heads 25–2 and 25–3 will have prescanned the remaining two-thirds of the line. If no data was sensed during the first one-third of the revolution on head 25–2 then the output signal is switched from head 25–1 to head 25–2. If no data was sensed on heads 25–2 and 25–3 during the initial one-third revolution, then the output signal is switched to head 25–2 and a line advanced pulse is generated by logic network 27. If no signal is sensed on head 25–3 only, then nothing happens. Thus, by selectively permutating the output selection of the multidetector heads equally spaced around the drum line skipping may be accomplished thereby decreasing the transmission time for blank areas. Obviously, in this embodiment a savings will occur only if segments of lines are blank at intervals of one-third of the page wide and either start or stop at the starting one-third or two-third positions on the page. While three equally spaced detectors are shown about the periphery, any number may be employed. Further, while a rotating drum reader is shown, this multielement pre-scan technique would be equally applicable to a flat bed reader with a multi element detector array being sequentially scanned, by for example, an electronic commutator.

As shown in FIG. 2, the printer must have an equal number of printing heads correspondingly oriented to those in the transmitter. Further, the head switching or selecting signal developed by logic network must be transmitted during the data periods to actuate pen selector 29 at the receiver to select the appropriate print head.

Figure 3:
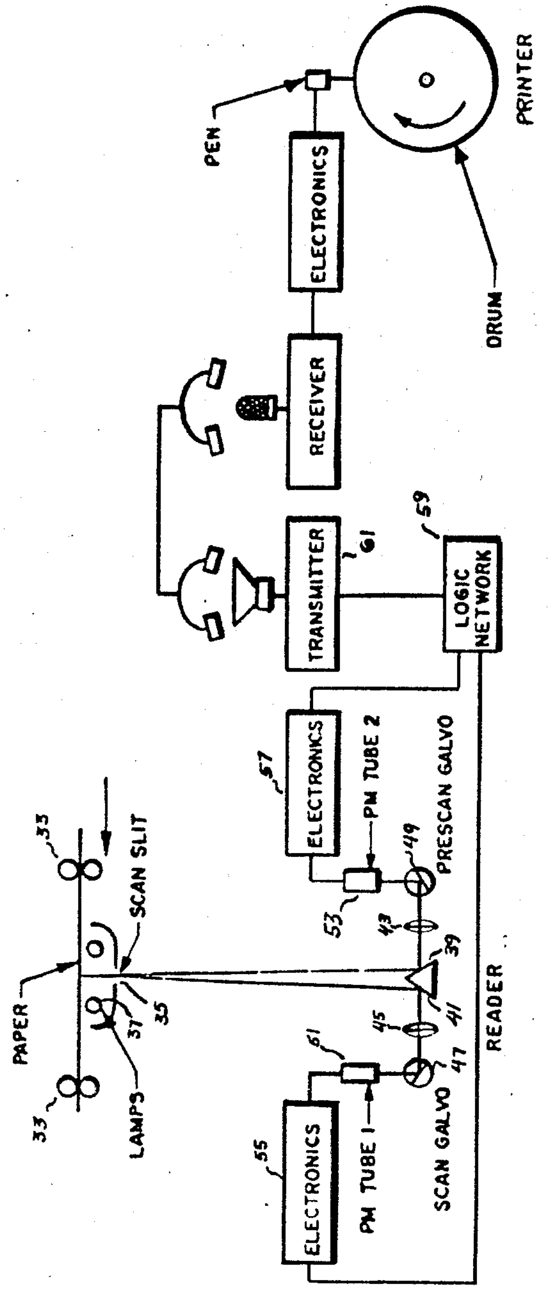
FIG. 3 is a block diagram of a facsimile system in accordance with another aspect of the invention.

Referring now to FIG. 3 there is shown a velocity pre-scan system suitable for developing appropriate line skipping signals in a facsimile system in accordance with another embodiment with the present invention. In the velocity pre-scan method of line skipping, the next available line in the direction of scan is rapidly scanned while a data line is being read-out. For example, the pre-scan rate may be ten times the normal read-out rate which, for example, may be in the order of three scans per second. As shown, the document 31 to be scanned is fed between driven coacting rollers 33 which incrementally transport it past a scan slit 35. The document area in the vicinity of the scan slit is appropriately illuminated by lamps 37 and the varying intensity light reflected from the normal scan line and pre-scan line adjacent thereto is reflected by mirrors 39 and 41, lens 43 and 45 to the respective scan and pre-scan mirrors 47 and 49. The scan and pre-scan mirrors, may for example, comprise mirrors mounted on a brush galvanometer as is taught in a copending application entitled "Facsimile Line Skipping System," Ser. No. 471,799.

The prescan and scan mirrors reflect the respective varying intensity light signals from a scan line and pre-scan line to its associated photomultiplier tubes 51 and 53 with the output of the respective photomultiplier tubes being fed to amplifiers 55 and 57. The output of the amplifiers is coupled to a logic network 59 which in turn triggers the transmitter 61. The logic network, in a manner hereinafter to be more fully described, also develops appropriate signals in response to the detection of a blank line by the prescan galvanometer to rapidly advance an incremental stepping drive, not shown. Normally at the end of the line a single advance command is generated which permits the galvanometer to start along the next line and the prescan galvonometer to quickly prescan the next line forward thereof. If the prescan detector indicates that this line is blank a further advance signal is immediately given. If the prescan detector indicates the line is not blank a normal scan is allowed to complete read-out before the next advance positions the galvonometer to the next line. If several successive lines are blank the prescan galvonometer will cause several advance commands, for example, one every tenth of a revolution, until all blank lines are skipped and the video galvonometer is positioned on the next data line. The normal advance command and the step advance command generated in response to the detection of a blank line are transmitted, for example, during the normal synchronization time to the receiver. In response thereto by means, not shown, the receiver accurately positions the record pen at the proper position corresponding to the next position to be scanned in the document at the transmitter.

Figures 4A, 4B:
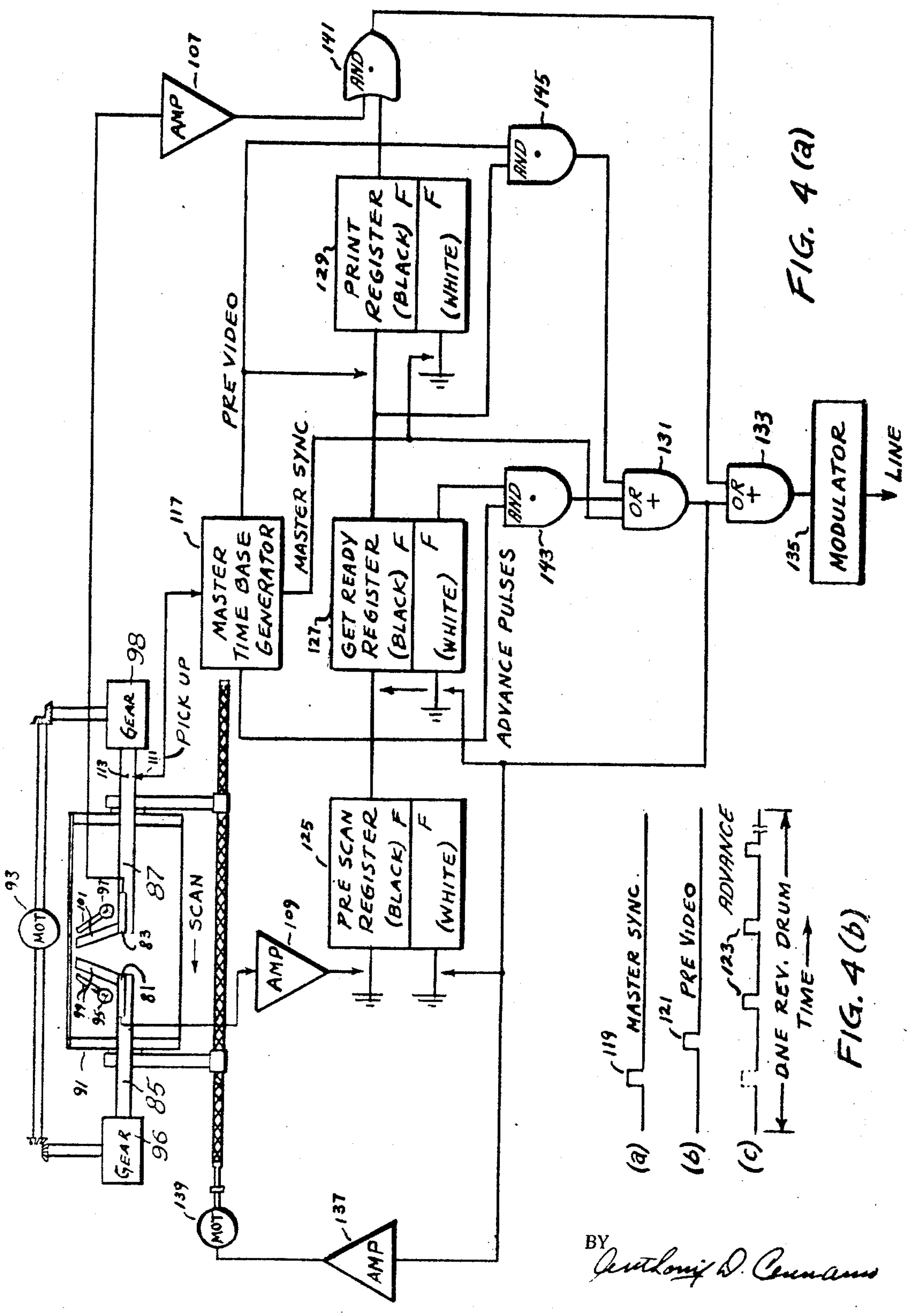
FIG. 4(A) is a block diagram of a facsimile transmitter in accordance with a first aspect of applicants' invention.
FIG. 4(B) is a group of idealized voltage-time waveforms for controlling the operation of the logical circuitry shown in FIG. 1A.

Referring now to FIG. 4(A) there is shown a schematic diagram of a facsimile transmitter embodying yet another aspect of the present invention. The prescan method embodied in FIG. 4 is similar to the velocity prescan method as set forth in FIG. 3. A prescan detector 81 and a normal scan detector 83 are mounted for rotation on shafts 85 and 87 which are journaled for rotation within drum 91. The configuration embodied in the facsimile transmitter shown in FIG. 4(A) corresponds to an inside-out-cylindrical geometry in which the prescan and scan detectors rotate inside the drum and the document to be scanned is placed facedown on a transparent outer surface of the drum. The prescan and scan detectors are driven by suitable means, for example, motor 93 and gears 96 and 98 such that the velocity of the prescan detector 81 is an integral multiple of the velocity of the normal scan detector 83. Drum 91 is translatably supported on a lead screw which is controlled by a stepping motor 139 for a purpose hereinafter to be more fully explained. The scan direction is, as shown by the arrow, from left to right, such that the prescan detector scans the next line forward of the normal scan detector in the normal direction of scan.

As hereinabove stated, with respect to FIG. 3, the purpose of the prescan detector is to detect the presence of blank portions of the document to be transmitted within a submultiple of the scan time of the normal scan detector and to actuate logical control circuitry for rapidly advancing the transmitter drum betwen normal scan time so as to position the normal scan detector at the next non-blank line. The document to be transmitted is mounted on the surface of drum 91 facedown and held by any means not shown, for example, spring clips. The drum is then positioned in the start position and the prescan and scan detectors are respectively rotated by motor 93. A small region on the drum is brightly illuminated by lamps 95 and 97 and light conducting members 99 and 101 which focus the light spot on the lines to be scanned by the prescan and normal scan detectors respectively. These illuminated spots and density variations arising therefrom, are focused by light conducting members 103 and 105 onto the light sensitive portion of the prescan and scan detectors 81 and 83. The output of the respective prescan and scan detectors are fed to amplifiers 107 and 109 which may comprise any amplifier well known in the art normally used in such facsimile systems. During the rotation of the normal or slow scan shaft, a signal is periodically generated in pick-up 111 by the passage once per revolution of bench mark 113 on shaft 115. This signal is fed to a master time base generator 117 which, as hereinafter to be more fully described, generates the timing pulses necessary for clocking the operation of the logical circuitry. As shown in FIG. 4B, the basic timing pulses comprise one master sync pulse 119 per revolution, occurring at the beginning of a line scan; one pre-video pulse 121 occurring shortly after the master sync pulse, and a plurality of advance pulses 123.

The operation of the logical gates which either selectively pass the video signals in the normal mode or pass line advance or shifting pulses to control the stepping motor of the transmitter and receiver is controlled by the respective state of three bistable flip-flops denominated prescan register 125, get ready register 127 and print register 129. The flip-flops as well as the logical gates associated therewith, may be of any type well known in the art, for example, a flip-flop may comprise a transistorized cross-coupled multivibrator in which two true signals at one of its two inputs sets the flip-flop into that state. Further, the logical AND and OR gates may be of any type well known in the art which perform the logical function indicated by their descriptive name.

During the operation of the facsimile transmitter if the prescan detector detects information in the next line in the direction of scan, the signal from the prescan detector and amplifier sets the prescan register 125 to the "black" state indicating that there is information on the next line. At the beginning of the next scan time the master sync pulse resets print register 129 to the "white" state and also actuates OR gate 131 which in turn actuates OR gate 133 and to an output terminal or modulator 135 to transmit the sync pulse. This master sync pulse out of OR gate 131 is coupled to amplifier 137 to actuate stepping motor 139 at the transmitter and also to the reset or "white" inputs of the prescan register 125 and the pulse inputs of the get-ready register 127. If the prescan register 125 is in the "black" state this sync pulse transfers the information contained therein to the get ready register 127. The get ready register is then in the "black" state, i.e., there is information on the next line and therefore the prevideo pulse can set the print register to the "black" state thereby conditioning AND gate 141. With AND gate 141 conditionally enabled the signals emanating from amplifier 107 which corresponds to the density variations in the scanned document from the normal scan detector are coupled to OR gate 133 which in turn is coupled to a terminal or modulator 135 which may for example, comprise a shift-key modulator for generating two varying frequency signals indicative of the information content of the scanned document. As hereinafter to be more fully explained in conjunction with FIG. 6, the signals from modulator 135 are coupled to a communication link for example, a telephone line, for transmission to the receiver. During this period of normal scan and video transmission the advance pulses which are used to incrementally advance the drum are not passed by AND gate 143 because get ready register 127 has been in the "black" condition and therefore AND gate 143 is disabled.

Assuming now that during the normal scan of the last line the prescan selector has not detected information then prescan register 125 remains in the "white" state and therefore get-ready register 127 will not be triggered to the "black" state by the next master sync pulse at the beginning of the next line scan time. The master sync pulse actuates the stepping motor 129 to bring the normal scan detector to the next non-blank line and again the prescan detector looks for information on the next line. With the get ready register in the "white" state the prevideo pulse is unable to trigger print register 129 to the "black" state and therefore AND gate 141 is blocked. This prevideo pulse is not coupled through AND gate 145 as its input, tied to the "black" output of the get ready register 127, would be false and therefore the prevideo pulse would not be coupled to OR gate 131 for transmission to the receiver. However, with get ready register 127 in the "white" state AND gate 143 is enabled and therefore the subsequent advance pulse emanating from the master time generator 117 would be coupled to another input of OR gate 131. The output of OR gate 131 would be coupled via OR gate 133 to the modulator 135 and thereby to the receiver. Additionally, the output of OR gate 131 would be coupled to reset the prescan register 125 and the get ready register 127 to the "white" state and to amplifier 137 to actuate the stepping motor 139. In response to each advance pulse stepping motor 139 advances the lead screw thereby positioning the prescan and scan detectors at the next line. The advance pulses will continue to incrementally advance the drum until the prescan detector 81 detects the presence of information on the line it is scanning. When the prescan selector detects information on a line the prescan register is set in the "black" state and the next advance pulse positions the normal scan detector on this line and resets the prescan register to the "white" state and transfers the information, i.e., the black from the prescan register to the get ready register thereby inhibiting AND gate 143 to prevent the passage of subsequent advance pulses. The number of advance pulses per revolution of the drum would be a function of the speed of the stepping motor and the speed of the prescan detector and any suitable number could be employed. The possibility of overstepping the normal scan detector beyond the next available information or data line is precluded by interlacing the master prevideo and advance pulses such that the prevideo is positioned between the master sync and advance pulses. As shown in FIG. 4B it is not necessary to delete the first advance pulse if it coincides with the master sync pulse.

Referring now to FIG. 5 there is shown a schematic diagram of a facsimile transmitter embodying the *n*-line prescan detector array in accordance with that aspect of applicants invention disclosed in FIG. 1.

The method of prescanning and line skipping disclosed in FIG. 5, is essentially similar to that described in conjunction with FIG. 1 in which a plurality of prescan detectors are in line with and precede the normal scan detector in the direction of scan. In response to the detection by the prescan detectors of a blank area, the logic circuitry actuated by the prescan array blocks the transmission of video and in place thereof selectively gates the proper number of advance pulses to selectively position the normal scan detector at the transmitter and the printing element at the receiver at the next appropriate line. As hereinabove stated, with respect to the bistable elements and the logical gating elements any devices well known in the art may be employed.

In operation, the document to be transmitted is mounted by any means well known in the art, for example, spring clips, not shown, on reading drum 155 which is rotatably supported by any means, not shown, and adapted to be driven for example, by motor 157. Normal scan detector 159 and a plurality of prescan detectors 161 which may be of any type well known in the art are translatably mounted on lead screw 163. Lead screw 163 is coupled to and adapted to be incrementally driven by any means well known in the art, for example, a stepping motor 165 to incrementally step the detector array along the document in the direction to be scanned. A small region on the drum is brightly illuminated by for example, light source 167 and the intensity variations emanating from the scanned document are coupled via the respective detectors to the photomultiplier and amplifiers 169 respectively associated therewith. The normal scan and prescan detectors are arranged to scan successive lines of the document as the drum is rotated. While for drafting convenience only a few detectors are shown and the detectors are spaced apart, in an actual embodiment any means, for example, light pipes could be used to focus and concentrate the light spot on adjacent lines to be scanned and to pick up the density variations emanating from the moving document.

In operation the function of the normal scan detector is, as in a normal facsimile operation, the detect the density variation from the portion of the document being scanned and to convert these into two level signals indicative of the information on the document to control a modulator for generating appropriate signals for transmission to the receiver. The function of the prescan detectors is to look ahead during the normal scanning by the slow speed detector and to locate the presence of blank areas on the document and to actuate in response to the detection of blank areas immediately forward of the normal scan detector logic control circuitry to permit the rapid actuation of the incremental drive means 165 to swiftly position the normal scan detector, after it has completed a line scan, to the next available line of information. During the line skipping mode, the advance pulses must be gated to the modulator and transmitted to the receiver to position the recording device at the next appropriate line for printing information.

Figures 5A, 5B:
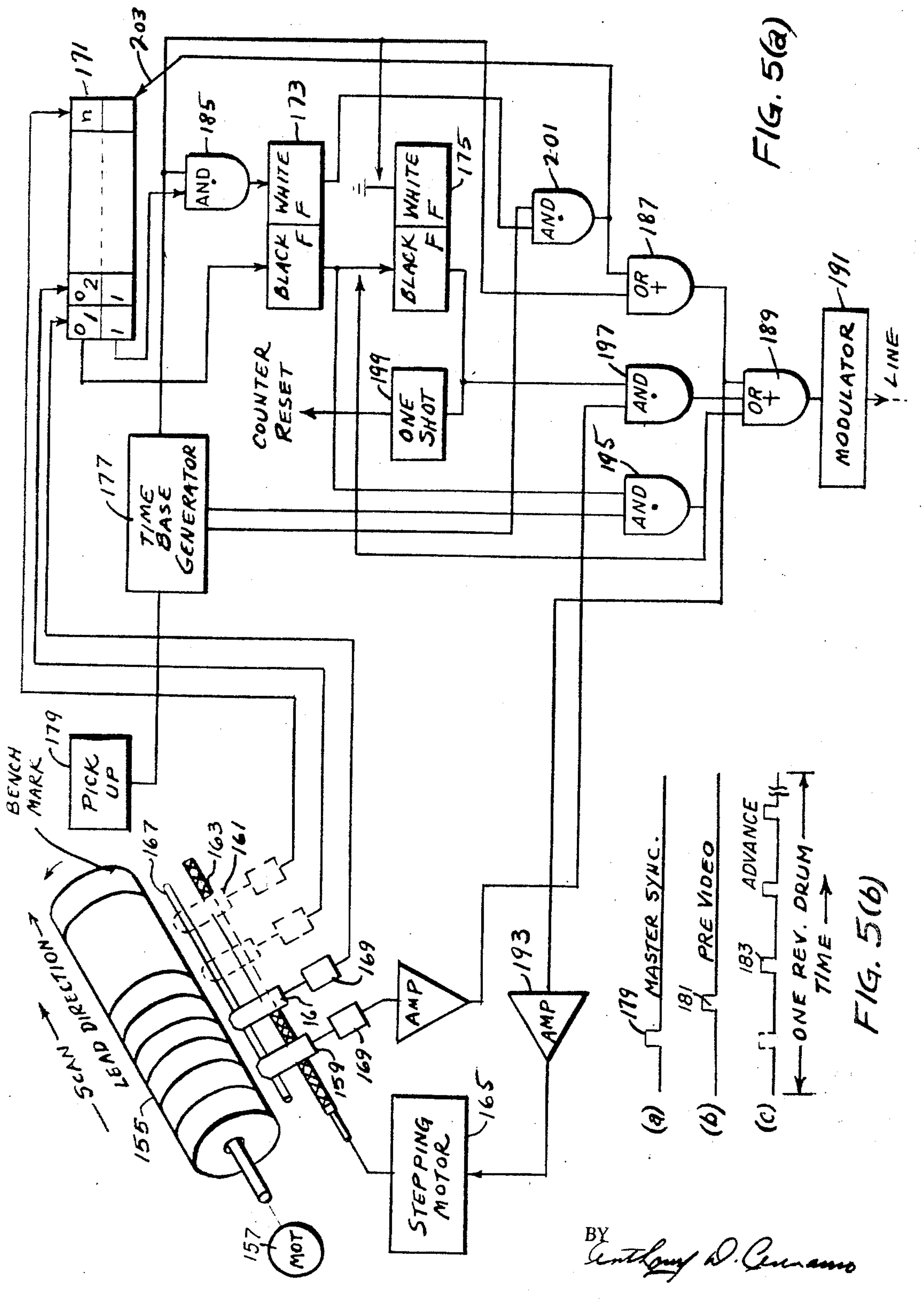
FIG. 5(A) is a block diagram of a facsimile transmitter in accordance with yet another aspect of applicants' invention.
FIG. 5(B) is a group of idealized voltage-time waveforms for controlling the operation of the logical circuitry shown in FIG. 2A.

The logical gating shown in FIG. 5 is selectively controlled by the state of three bistable memory elements denominated the prescan register 171, the get ready flip-flop 173 and the print flip-flop 175. The actuation of the logical gating and memory elements is controlled by timing pulses emanating from a time base generator 177. The input to the time base generator is derived by a pick up 179 from any suitable means, for example, a bench mark on the reading drum which induces a signal in the pick up once per revolution of the reading drum. As shown in FIG. 5(B), a basic timing pattern emanating from time base generator 177, per revolution of the drum includes one master sync pulse 179, one prevideo pulse 181 following the master sync pulse, and before the next advance pulse, and a plurality of advance pulses 183. In addition, a reset pulse for resetting the bistable elements could be derived, however, one revolution of the drum at the beginning of the scan cycle will reset the elements properly and as is known in the art there is usually sufficient margin to permit proper operation to be established without initially resetting the proper condition.

In the normal scanning mode, i.e., when the prescan detectors have detected information on the next adjacent line to the line being scanned, the lowest order, i.e., the left hand, stage of prescan register 171 is in the "black" or "zero" state and thus AND gate 185 is not conditionally enabled. In this condition the master sync pulse emanating from the time base generator 177 at the beginning of the next print cycle does not trigger AND gate 185 and thus get ready flip-flop 173 remains in the "black" state. This same master sync pulse triggers print flip-flop 175 to the "white" state and simultaneously actuates OR gate 187 thereby triggering output OR gate 189 and the modulator 191 to transmit the sync pulse. This sync pulse also simultaneously actuates amplifier 193 which controls the initiation of the incremental step drive 165 to position the detector array at the next line. The next pulse emanating from the time base generator is a prevideo pulse which is applied to AND gate 195 and since the other input to AND gate 195 is derived from the "black" side of get ready flip-flop 173 which is presently in the "black" or true state, the prevideo pulse is gated through AND gate 195 to the output OR gate 189 and to the modulator. Simultaneously, the output of AND gate 195 is gated to the input of the "black" side of print flip-flop 175 thereby resetting the print flip-flop to the "black" state thus conditionally enabling the video output AND gate 197 and actuating one shot 199 to reset the prescan register 171. With video AND gate 197 conditionally enabled by the print flip-flop 175, the density variation two level signals emanating from the normal scan detector amplifier are gated to the output OR gate 189 and from there to the modulator 191. In the modulator the two level signals corresponding to the information emanating from the normal scan detector are generated and transmitted via the communication link to the receiver. During the transmission of the signals from the normal scan detector the *n*-line prescan detectors continuously monitor the plurality of next adjacent lines in the direction of scan and in response to the detection of a totally blank line each prescan detector would not trigger the stage of the prescan register 171 associated therewith from the "white" state. With get ready flip-flop 173 in the "black" state AND gate 201 is not conditionally enabled and therefore the advance pulses emanating from the time base generator during the scan period would not be gated from AND gate 201.

If during the line scan by the normal scan detector the prescan detector associated with the lowest stage detects a white or blank line then the lowest order stage in prescan register 171 would be set to the "white" condition. With the lowest order stage of prescan register 171 in the "white" condition, AND gate 185 is conditionally enabled and thus will pass the next master sync pulse thereby triggering get ready flip-flop 173 to the "white" state. This same master sync pulse triggers print flip-flop 175 to the "white" state and actuates OR gate 187. The output of OR gate 187 actuates output OR gate 189 and amplifier 193 which controls the incremental step drive 165. Thus, the master sync pulse is transmitted to the receiver to step the receiver printing device to the next line in synchronism with the read detector. With get ready flip-flop 173 now in the "white" state, the prevideo pulse is blocked and cannot get through AND gate 195 thus, print flip-flop 175 remains in the "white" state thereby blocking the video output AND gate 197. As long as get ready flip-flop 173 is in the "white" state the advance pulses emanating from the time base generator 177 are gated through AND gate 201 to the input of OR gate 187. The output of AND gate 201 is coupled to countdown input 203 of the prescan register. Thus, as long as the lowest order stage of prescan register 171 remains in the "white" state get ready flip-flop remains in the "white" state thereby conditionally enabling AND gate 201 which gates the advance pulse to the OR gate 187 and to the count down input 203 of register 171. Depending upon the count set up in prescan register 171 by the prescan detector array, a number of advance pulses will be gated through AND gate 201 to output OR gate 187 thereby simultaneously stepping the detector array at the transmitter and the print element at the receiver to the next line containing information to be transmitted and recorded respectively.

When the lowest order stage, i.e., the left-hand stage, of prescan register 171 is returned by the advance pulse to reset 203 to the "black" state, get ready flip-flop 173 is triggered to the "black" state thereby disabling AND gate 201. With AND gate 201 disabled no more advance pulses are gated through OR gate 187 and thus the incremental step drive at the transmitter and the incremental step drive at the receiver remains inactive until the next master sync pulse. Upon the occurrence of the next master sync pulse print flip-flop 175 is driven to the "white" state and the master sync pulse is simultaneously gated through OR gate 187 to the incremental step drive of the transmitter and via the modulator to the receiver to position the slow scan detector and print element respectively, at the next available line. Since the get ready flip-flop 173 was placed in the "black" state by the pulse generated when the last stage of the preset register 171 was reset to the zero or "black" state the prevideo pulse emanating from the time base generator after the master sync pulse is gated through AND gate 197 and this pulse resets print flip-flop 175 to the "black" state and is transmitted to the receiver to ready the receiver for a print operation. With print flip-flop 175 in the "black" state the output video gate 197 is conditionally enabled thus passing the video signals from the normal scan detector to the modulator. The get ready flip-flop 173 remains in the "black" state until the next master sync pulse and thus the advance pulses are not gated through AND gate 201 during the normal scan operation. The normal scan mode and stepping advance mode continue as a function of the information content in the document to be transmitted.

Figure 6:
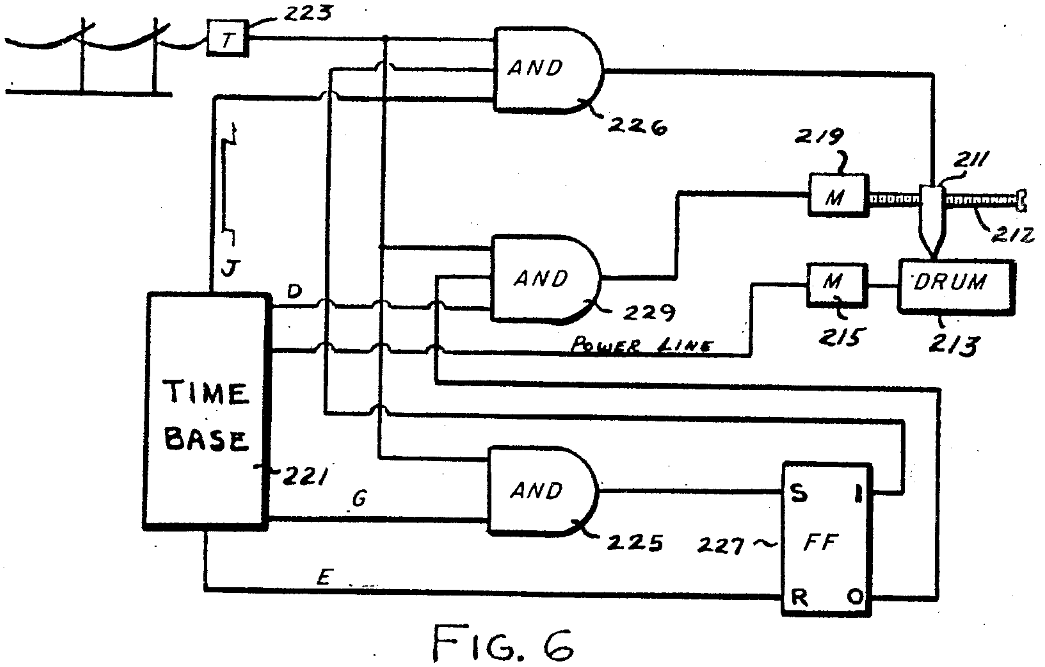
FIG. 6 is a block diagram of a facsimile receiver compatible with the transmitters shown in FIGS. 1 and 3.

In order to form a useful facsimile transmission system, facsimile transmitters such as that shown in FIGS. 4(A) and 5(A) must be used in conjunction with a compatible receiver. A suitable receiver is schematically illustrated in FIG. 6. As shown, the receiver comprises a marking head 211 of any conventional type, operating in conjunction with and writing on a continuously rotating recording drum 213 which is driven by a motor 215. Recording head 211 is mounted on a lead screw 217 which is coupled to and intermittently advanced by a stepping motor 219. Drum 213 must rotate in exact synchronism with slow scan detectors of FIGS. 4(A) and 5(A). The time generator 221 provides various electrical signals which are synchronized with the corresponding signals of the hereinabove mentioned facsimile transmitters. Any conventional means may be used to synchronize time base circuit 221 in the receiver with the transmitter, for example, the transmitted master sync pulse may be used to correctly phase the time base generator 221 at the receiver with the transmitter.

Time base generator 221 generates four timing pulse streams to control the logic circuitry at the receiver for separating the video and advance pulses which are transmitted in a multiplex mode. Waveform D corresponds to the advance or step pulses as shown in FIGS. 4(B) and 5(B), waveform E corresponds to the master sync pulse and waveform G corresponds to the prevideo pulse. When a prevideo pulse is received at input terminal or demodulator 223 a coincidence is detected in AND gate 225 with a corresponding locally generated G pulse and this coincidence is used to set flip-flop 227 to its "1" state. Thereupon, during the time interval of the J signal, which is a video window pulse, incoming video signals received at input terminal 223 are enabled to pass through AND gate 226 to recording head 211. After a single scan line has been recorded, flip-flop 227 is reset by a locally generated E signal and recording head 211 is thereby disconnected from input terminal 223. An incoming advance clock signal will generate a coincidence in AND gate 229 with the corresponding locally generated D signal and cause stepping motor 219 to advance the recording head, an increment corresponding to one line. Each subsequently received advance clock pulses, if any, will be enabled to operate the stepping motor. Receipt of the next prevideo pulse at terminal 223 will set flip-flop 227 and reconnect recording head 211 to input terminal 223. In this way, an exact facsimile of the transmitted document is recorded on drum 213 even though an intermittent scan is employed at the transmitter whereas the recording drum is rotated at a constant speed. Of course, recording could also be effected by an optical scanning system of any type well known in the art. In an optical scanning system, for example, receipt of a prevideo signal could be used to initiate a slow scan synchronized with that of the transmitter. However, for recording purposes it is particularly advantageous to use a non-optical system and it then becomes almost essential to employ components rotating at a constant velocity. This becomes possible with the present invention and is a particular advantage of this invention.

The transmitter and receiver have been described as two-level devices, that is devices adapted to generate and receive two distinct signals corresponding to the black and white respectively. This is preferred for optimum utilization of transmission channels and provides excellent reproduction of typed or printed documents for which the invention is particularly adapted. The invention may, however, readily be adapted for transmission of a wider range of tonal values as may be encountered in transmitting areas of documents containing pictures or the like. For a more complete understanding of modifications which may be made to accomplish a transmission and reception of a wider range of tonal values reference may be had to the hereinabove referenced copending application Ser. No. 471,799.

The invention has been described in terms of specific embodiments of a line skipping apparatus, but many modifications will suggest themselves to those skilled in the art for accomplishing the results of the invention while following applicants' teaching. Thus, the particular form of apparatus employed for scanning and recording purposes may be replaced by others known in the art by adapting these other scanning and recording apparatus to perform in substantially the same manner as taught by the applicants. The particular set of internal control signals described hereinabove are obviously not unique nor are the externally transmitted controlled signals. Signals must, however, be generated at the facsimile transmitter and identified at the facsimile receiver which are adequate to control the receiver stepper in synchronism with the transmitter stepper. The particular logical circuitry is, as well known in the art, not unique and may be subject to wide circuit variations and therefore may be adapted in accordance with generally understood principles for use with a different type of logical gates or different sets of internal control signals or the like.

The foregoing description and drawings are to be understood to be illustrative only and the invention is to be interpreted broadly in terms of basic concepts. It is therefore applicants' intention to be limited only as indicated by the scope of the following claims.

What is claimed is:

1. Time conserving facsimile scanning apparatus comprising:

a plurality of scanning means positioned to simultaneously scan a plurality of adjacent scan lines of an original subject, the first of said scanning means for generating video signals for transmission, and the remainder of said scanning means for detecting the presence of intelligence in said scan lines, advance means to sequentially selectively reposition all of said scanning means relative to said original subject whereby only those lines in which intelligence was previously detected by said remaining scanning means are scanned by said first scanning means, said advance means advancing said scanning means the distance between adjacent scan lines in a time less than the time to scan a line divided by the number of scanners.

2. Time conserving facsimile scanning apparatus comprising:

a plurality of scanning means positioned to simultaneously scan a plurality of adjacent scan lines of an original subject, the first of said scanning means for generating video signals for transmission, and the remainder of said scanning means for detecting the presence of intelligence in said scan lines, advance means to sequentially selectively reposition all of said scanning means relative to said original subject whereby only those lines in which intelligence was previously detected by said remaining scanning means are scanned by said first scanning means, said plurality of scanning means comprising first and second scanners, the second of said scanners scanning a line in a fraction of the time required by said first scanner.

3. Time conversing facsimile scanning apparatus comprising:

a plurality of scanning means positioned to simultaneously scan a plurality of adjacent scan lines of an original subject, the first of said scanning means for generating video signals for transmission, and the remainder of said scanning means for detecting the presence of intelligence in said scan lines, advance means to sequentially selectively reposition all of said scanning means relative to said original subject whereby only those lines in which intelligence was previously detected by said remaining scanning means are scanned by said first scanning means, said plurality of scanning means comprising first and second scanners, the second of said scanners scanning a line in a fraction of the time required by said first scanner, and in which said advance means advances said scanning means the distance between adjacent scan lines in a time less than the time for the first scanner to scan a line multipled by said fraction.

4. A facsimile transmitter comprising:

scanning means to simultaneously scan a plurality of sampling spots in a plurality of positions on a document to be transmitted and to generate electrical video signals related to the document brightness corresponding to said spots, advance means to advance said scanning means in uniform increments in a direction substantially perpedicular to the direction of said scan at the end of each normal scan time, control means responsive to at least a portion of said scanning means for selectively gating stepping pulses for actuating said advance means to incrementally advance said scanning means at times between said normal scan times, means for transmitting only video signals and a master sync pulse during said normal scan time, means for transmitting said stepping pulses in response to the actuation of said control means, said scanning means comprising a plurality of selectively gateable scan detectors equally spaced apart about the periphery of a reading drum and further including logic means for selectively designating one of said scan detectors as the video scan detector and the remaining detectors as prescan detectors during at least a portion of said scan time.

5. The time conserving method of facsimile transmission comprising the steps of:

simultaneously line scanning a first plurality of lines of a document to be transmitted so that each scan line is scanned for the presence of intelligence therein and each line bearing intelligence therein is successively scanned for the detection of such intelligence, scanning the next like plurality of lines of the document wherein at least the first of said lines in the direction of scan contains intelligence, said step of line scanning comprises the steps of scanning the next line in the direction of scan for video signals at a normal scanning velocity and scanning at least the next adjacent line forward of the normal scan at a velocity at least twice the velocity of the normal scan, generating an advance signal corresponding to each scan line advance, generating a prevideo pulse corresponding to the direction of information in the next line to be scanned in the direction of scan, transmitting each of said signals to a facsimile receiver, and detecting the advance signals at said receiver and incrementally advancing the receiver scanner in response thereto.

6. A graphic communication system comprising:

a facsimile transmitter including a sub-element means for rotatably supporting a document to be transmitted, scanning means including a normal scan video detector means and at least one prescan detector means for simultaneously scanning a plurality of corresponding sampling spots in a plurality of adjacent lines of the document to be transmitted, said prescen detector means scanning said plurality of sampling spots in a fraction of the time required by said normal scan video detector means, advance means for causing incremental translatory motion between said scanning means and said sub-element means in uniform increments in a direction substantially perpendicular to said lines at the end of each said normal scan, control means responsive to said prescan detector means for generating a skip pulse when at least the next adjacent line forward of the video detector means is devoid of information, means responsive to said control means to selectively operate said advance means at the end of said normal scan, a facsimile receiver including:

means for rotatably supporting a printing drum, marking means responsive to receive video signals and, means for incrementally advancing said marking means in response to receive advance signals and a transmission path linking said transmitter and receiver for transmission of said video signals and said advance pulses.

7. A graphic communication system comprising:

a facsimile transmitter including a sub-element means for rotatably supporting a document to be transmitted, scanning means including a normal scan video detector means and at least one prescan detector means for simultaneously scanning a plurality of corresponding sampling spots in a plurality of adjacent lines of the document to be transmitted, said prescan and normal scan means comprising a pair of independently rotatable detectors positioned within said subelement means, wherein the prescan means rotates at an integral multiple of the velocity of the normal scan means, advance means for causing incremental translatory motion between said scanning means and said subelement means in uniform increments in a direction substantially perpendicular to said lines at the end of each said normal scan, control means responsive to said prescan detector means for generating a skip pulse when at least the next adjacent line forward of the video detector means is devoid of information, means responsive to said control means to selectively operate said advance means at the end of said normal scan, a facsimile receiver including:

means for rotatably supporting a printing drum, marking means responsive to receive video signals and, means for incrementally advancing said marking means in response to receive advance signals and, a transmission path linking said transmitter and receiver for transmission of said video signals and said advance pulses.

8. Facsimile system comprising:

means for rotatably supporting a reading drum, a plurality of spaced apart detector heads equally spaced about the periphery of said reading drum, logic means responsive to signals emanating from said detector heads for selectively denominating one of said heads during at least a portion of a revolution of said drum as the video detector head and the remaining detector heads as prescanned heads and for controlling the selective transmission of video signals and head selective signals in a multiplex mode, transmitter means responsive to said logic means, receiver means coupled to said transmitter means by a communication link, a rotatably supported recording drum, a like plurality of spaced apart recording heads correspondingly configured about the recording drum, and logic means responsive to receive video and head selection pulses for selectively denominating one of said receiving heads as the video recording head during at least a portion of a revolution of said recording drum.

References Cited

UNITED STATES PATENTS

| | | | |
|---|---|---|---|
| 2,957,941 | 10/1960 | Covely | 178—6.8 |
| 3,128,338 | 4/1964 | Teacher et al. | 178—6.8 |
| 3,201,512 | 8/1965 | Mason et al. | 178—6 |
| 3,286,026 | 11/1966 | Greutman et al. | 178—6.8 |

ROBERT L. GRIFFIN, *Primary Examiner.*

R. K. ECKERT, Jr., *Assistant Examiner.*

U.S. Cl. X.R.

178—6.6, 7.6